(12) United States Patent
Shen et al.

(10) Patent No.: US 10,483,019 B2
(45) Date of Patent: Nov. 19, 2019

(54) ULTRA-FLEXIBLE INDOOR ACCOMPANYING PHOTOELECTRIC COMPOSITE CABLE

(71) Applicant: JIANGSU ETERN COMPANY LIMITED, Wujiang (CN)

(72) Inventors: Feng Shen, Wujiang (CN); Jianjun Zhang, Wujiang (CN); Honglei Yang, Wujiang (CN); Xiaohong Chen, Wujiang (CN); Zifeng Yao, Wujiang (CN); Danfeng Ling, Wujiang (CN); Guijun Xia, Wujiang (CN)

(73) Assignee: JIANGSU ETERN COMPANY LIMITED, Wujiang (CN)

( * ) Notice: Subject to any disclaimer, the term of this patent is extended or adjusted under 35 U.S.C. 154(b) by 0 days.

(21) Appl. No.: 15/566,375

(22) PCT Filed: Aug. 20, 2015

(86) PCT No.: PCT/CN2015/087648
§ 371 (c)(1),
(2) Date: Nov. 22, 2017

(87) PCT Pub. No.: WO2016/179919
PCT Pub. Date: Nov. 17, 2016

(65) Prior Publication Data
US 2018/0108454 A1    Apr. 19, 2018

(30) Foreign Application Priority Data

May 12, 2015    (CN) .......................... 2015 1 0237815

(51) Int. Cl.
*H01B 9/00*    (2006.01)
*H01B 7/295*    (2006.01)
(Continued)

(52) U.S. Cl.
CPC ........... *H01B 9/005* (2013.01); *G02B 6/4436* (2013.01); *H01B 3/18* (2013.01); *H01B 7/0823* (2013.01);
(Continued)

(58) Field of Classification Search
CPC .... H01B 9/005; H01B 7/0823; G02B 6/4416; G02B 6/4436
See application file for complete search history.

(56) References Cited

U.S. PATENT DOCUMENTS

| | | | | |
|---|---|---|---|---|
| 4,945,191 A | * | 7/1990 | Satsuka | .................. H01B 3/421 174/120 SR |
| 6,577,797 B2 | * | 6/2003 | Quiroz | ................. G02B 6/4416 385/114 |

FOREIGN PATENT DOCUMENTS

| | | |
|---|---|---|
| CN | 202217542 U | 5/2012 |
| CN | 202258546 U | 5/2012 |

(Continued)

*Primary Examiner* — Omar R Rojas
(74) *Attorney, Agent, or Firm* — SZDC Law P.C.

(57) ABSTRACT

The invention provides an ultra-flexible indoor accompanying photoelectric composite cable, and the cable comprises a plurality of power transmission components, optical fiber transmission components and structural strengthening components, which are covered by a highly flame-retardant outer protective layer. The power transmission component comprises a cable core which is a soft conductor and an insulating material layer wrapped around the cable core. The optical fiber transmission component is a tight tube optical fiber, and the power transmission components and the optical fiber transmission components are arranged in parallel inside the highly flame-retardant outer protective layer. The composite cable of the invention has very strong pressure resistance, stress resistance, and reciprocating resistance, good electrical and physical properties and more excellent environment resistant performance. Furthermore, the com- (Continued)

posite cable can simplify construction procedures, improve working efficiency and reduce construction cost.

6 Claims, 1 Drawing Sheet

(51) Int. Cl.
　　　*H01B 11/22*　　　(2006.01)
　　　*G02B 6/44*　　　(2006.01)
　　　*H01B 7/08*　　　(2006.01)
　　　*H01B 7/22*　　　(2006.01)
　　　*H01B 13/24*　　　(2006.01)
　　　*H01B 3/18*　　　(2006.01)
　　　*H01B 1/02*　　　(2006.01)

(52) U.S. Cl.
　　　CPC ............. *H01B 7/225* (2013.01); *H01B 7/295* (2013.01); *H01B 9/006* (2013.01); *H01B 11/22* (2013.01); *H01B 13/24* (2013.01); *H01B 1/026* (2013.01)

(56) References Cited

FOREIGN PATENT DOCUMENTS

| | | | |
|---|---|---|---|
| CN | 104821196 A | | 8/2015 |
| CN | 204667920 U | | 9/2015 |
| JP | 56057004 A | * | 5/1981 |

\* cited by examiner

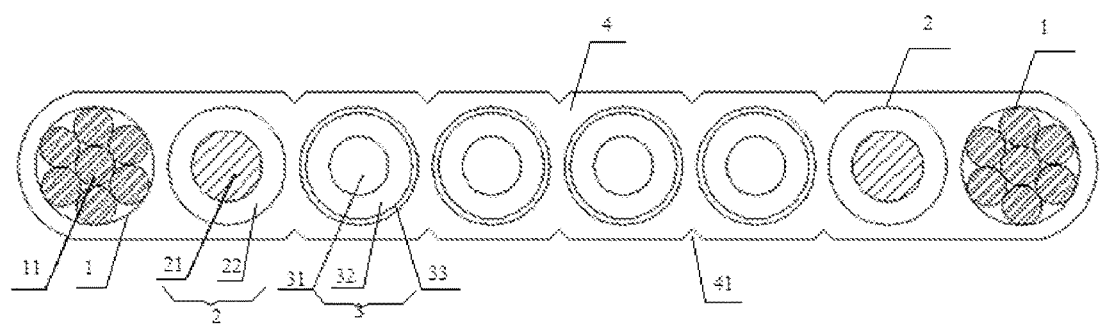

ULTRA-FLEXIBLE INDOOR ACCOMPANYING PHOTOELECTRIC COMPOSITE CABLE

This application is a national phase application of PCT/CN2015/087648, filed on Aug. 20, 2015, which claims priority to Chinese Patent Application No. CN 201510237815.6, filed on May 12, 2015, which is incorporated by reference for all purposes as if fully set forth herein.

FIELD OF THE INVENTION

The present invention relates to the field of electric power communication, particularly to a photoelectric composite cable, and more specifically to an ultra-flexible indoor accompanying photoelectric composite cable.

DESCRIPTION OF THE RELATED ART

In various indoor environments, both new construction processes and the subsequent use require a cable and an optical fiber for power supply and a communication system for signal transmission. A conventional method for controlling an indoor power supply system and communication system is that the power supply system is powered and controlled by a power cable and the communication system is controlled by a communication cable (network cable and optical cable). Such a conventional method requires two laying processes, leading to a long construction period, high difficulty and high cost.

With the development of technologies, an indoor photoelectric composite cable is proposed to solve the above problems. However, for some special indoor environments, there is a need for a photoelectric composite cable that has the advantages of very strong pressure resistance, stress resistance, and reciprocating resistance and can be directly applied to some application environments, such as wireless signal coverage in vertical shafts, renovation and installation of indoor distribution system for non-newly-built buildings, elevator fiber control and wireless signal coverage in large public places.

However, the existing commonly used photoelectric composite cables in prior art have the following defects: to achieve the power supply and communication functions and to overcome the defects in environmental performance, the structure of the photoelectric composite cable needs to be changed. As a result, the photoelectric composite cable has a large outer diameter and weight, and this leads to an increased center-of-gravity shift and poor flexibility of the cable, increased difficulty in indoor laying, and low pressure resistance and stress resistance. Therefore, there is a need of an indoor photoelectric composite cable that not only has good photoelectric properties but also has improved mechanical physical properties and environmental performance.

SUMMARY OF THE INVENTION

To solve the above technical problems, the present invention provides an ultra-flexible indoor accompanying photoelectric composite cable that has very strong pressure resistance, stress resistance and reciprocating resistance.

To achieve the above object, the following technical solutions are employed in the present invention.

The invention provides an ultra-flexible indoor accompanying photoelectric composite cable. The cable comprises a plurality of power transmission components, optical fiber transmission components and structural strengthening components, which are covered by a highly flame-retardant outer protective layer. The power transmission component comprises a cable core which is a soft conductor and an insulating material layer wrapped around the cable core, the optical fiber transmission component is a tight tube optical fiber, and the power transmission components and the optical fiber transmission components are arranged in parallel inside the highly flame-retardant outer protective layer.

In a preferred embodiment of the present invention, the tight tube optical fiber comprises, in sequence from inside to outside: a fiber core, a high-strength aramid fiber layer for improving flexibility of the photoelectric composite cable, and a tight-buffered coating layer, the high-strength aramid fiber layer is wrapped around the fiber core, and the tight-buffered coating layer is wrapped outside the high-strength aramid fiber layer.

In a preferred embodiment of the present invention, the insulating material is polyvinyl chloride or polyolefin, the soft conductor is a multi-core stranded copper conductor, and the high-strength aramid fiber layer is an aramid fiber layer of $18 \times 10^{12}$ psi.

In a preferred embodiment of the present invention, the structural strengthening component comprises multiple strands of high elastic tensile steel wires.

In a preferred embodiment of the present invention, a plurality of stress grooves are formed on two sides of the highly flame-retardant outer protective layer.

In a preferred embodiment of the present invention, the stress grooves are formed between the power transmission components and the optical fiber transmission components, and between the optical fiber transmission components.

In a preferred embodiment of the present invention, the highly flame-retardant outer protective layer is a flame-retardant polyolefin outer protective layer.

In a preferred embodiment of the present invention, the photoelectric composite cable is in a rectangular shape.

In a preferred embodiment of the present invention, the photoelectric composite cable comprises: two power transmission components, four optical fiber transmission components and two structural strengthening components.

In a preferred embodiment of the present invention, the internal components of the photoelectric composite cable are arranged in such a way that the power transmission components, the optical fiber transmission components, and the structural strengthening components are all arranged in parallel, the structural strengthening components are provided on two sides of the photoelectric composite cable, the power transmission components are respectively disposed at the inner side of the structural strengthening components, and the optical fiber transmission components are disposed between the two power transmission components.

As compared with the prior art, the present invention has the following beneficial effects:

Firstly, in the photoelectric composite cable of the present invention, the cable core for electric power transmission uses a non-flammable flame-retardant environment-friendly material, this not only can ensure the high insulating property of the cable, but also can reduce combustible materials in the structure. Also, a thermoplastic elastomer material is used as the insulating layer of the cable, thereby providing good electrical and physical properties and more excellent environment resistant performance.

Secondly, in the photoelectric composite cable of the present invention, the structural strengthening components are used in the cable core, and the structural strengthening component utilizes multiple strands of high elastic tensile steel wires, and thus has good strength and anti-fatigue property. A tight tube optical fiber is used as the optical fiber transmission component, and a high-strength aramid fiber is used in the tight tube optical fiber for strengthening, thereby ensuring the high flexibility of the cable.

Thirdly, in the photoelectric composite cable of the present invention, the outer protective layer uses a flame-retardant polyolefin material, and in-mold positioning is adopted for the cable core so that the relative positions of the optical unit and the electrical unit in the cutting plane are fixed, this ensures that the cable has excellent transmission performance and good mechanical and environmental performance, and will not release a large amount of toxic or hazardous smoke in the case of a fire.

Fourthly, in the photoelectric composite cable of the present invention, profile extrusion is adopted for the outer protective layer, to ensure that the cable is of a rectangular shape, thereby achieving structural seismic resistance, minimum center-of-gravity shift of the cable, optimal flexibility and minimum inner stress, enabling the cable to have a good bending property, simplifying construction procedures, improving working efficiency, and reducing construction cost.

BRIEF DESCRIPTION OF THE DRAWINGS

In order to illustrate the technical solutions in the embodiments of the present invention more clearly, the accompanying drawings used in the embodiments will be described simply. Obviously, the accompanying drawings described hereinafter only are some embodiments of the present invention, and other drawings also can be obtained without creative work for those skilled in the art.

FIG. 1 is a schematic sectional view of a photoelectric composite cable according to the present invention.

wherein 1—structural strengthening component, 11—high elastic tensile steel wire, 2—power transmission component, 21—cable core (soft conductor), 22—insulating material, 3—optical fiber transmission component, 31—fiber core, 32—high-strength aramid fiber layer, 33—tight-buffered coating layer, 4—highly flame-retardant outer protective layer, 41—stress groove.

DETAILED DESCRIPTION OF THE PREFERRED EMBODIMENTS

The technical solutions in the embodiments of the present invention will be described clearly and completely in combination with the accompanying drawings. Obviously, the described embodiments are parts of the embodiments of the present invention, instead of all of the embodiments. On the basis of the embodiments in the present invention, all other embodiments obtained by those skilled in the art without creative work belong to the protection scope of the present invention.

Embodiment

As shown in FIG. 1, this embodiment discloses an ultra-flexible indoor accompanying photoelectric composite cable, and the cable comprises a plurality of power transmission components 2, optical fiber transmission components 3, and structural strengthening components 1. The plurality of power transmission components 2, optical fiber transmission components 3, and structural strengthening components 1 are covered by a highly flame-retardant outer protective layer 4.

In this embodiment, a plurality of stress grooves 41 are formed on two sides of the highly flame-retardant outer protective layer 4, and the stress grooves 41 are formed between the power transmission components 2 and the optical fiber transmission components 3, and between the optical fiber transmission components 3. The above stress grooves 41 can reduce the stress of the internal structure of the photoelectric composite cable and enable the cable to have a good bending property.

The power transmission component 2 includes a cable core 21 and an insulating material 22 wrapped around the cable core 21. The cable core 21 is a soft conductor. The soft conductor has excellent bending resistance and reciprocating resistance. The soft conductor is a multi-core stranded copper soft conductor. The insulating material 22 is polyvinyl chloride or polyolefin. The highly flame-retardant outer protective layer 4 is a flame-retardant polyolefin outer protective layer. This structural design and material of the photoelectric composite cable enable the cable to have safe transmission performance and good mechanical and environmental performance. The highly flame-retardant and highly environment-friendly material has excellent environment-friendly features, will not release a large amount of toxic or hazardous smoke in the case of a fire and will not accelerate the spreading of the fire, and thus can greatly reduce fire damage.

In this embodiment, the optical fiber transmission component 3 is a tight tube optical fiber. The tight tube optical fiber includes, in sequence from inside to outside: a fiber core 31, a high-strength aramid fiber layer 32 for improving the flexibility of the photoelectric composite cable, and a tight-buffered coating layer 33. The high-strength aramid fiber layer 32 is wrapped around the fiber core 31, and the tight-buffered coating layer 33 is wrapped outside the high-strength aramid fiber layer 32. Because the tight tube optical fiber is used as the optical fiber transmission component and is strengthened using the high-strength aramid fiber layer, high flexibility of the photoelectric composite cable is ensured. The high-strength aramid fiber layer in this embodiment is an aramid fiber layer of $18 \times 10^{12}$ psi.

The structural strengthening component 1 includes multiple strands of high elastic tensile steel wires 11. The multiple strands of high elastic tensile steel wires are stranded together to form the structural strengthening component 1. Therefore, the composite cable has good strength and anti-fatigue property.

The photoelectric composite cable is in a rectangular shape. The power transmission components and the optical fiber transmission components are arranged in parallel inside the highly flame-retardant outer protective layer. Specifically, the photoelectric composite cable includes therein: two power transmission components 2, four optical fiber transmission components 3 and two structural strengthening components 1. The internal components of the photoelectric composite cable are arranged in the following manner: the power transmission components 2, the optical fiber transmission components 3, and the structural strengthening components 1 are all arranged in parallel, the structural strengthening components 1 are disposed on two sides of the photoelectric composite cable, the power transmission components 2 are respectively disposed at the inner side of the structural strengthening components 1, and the optical fiber transmission components 3 are disposed between the two power transmission components.

In the photoelectric composite cable of the present invention, in-mold positioning is adopted for the cable core so that the relative positions of the optical unit and the electrical unit in the cutting plane are fixed, this ensures that the cable has excellent transmission performance and good mechanical and environmental performance, and will not release a large amount of toxic or hazardous smoke in the case of a fire. Profile extrusion is adopted for the outer protective layer, to ensure that the cable is in a rectangular shape, thereby achieving structural seismic resistance, minimum center-of-gravity shift of the cable, optimal flexibility and minimum inner stress, enabling the cable to have a good bending property, simplifying construction procedures, improving working efficiency, and reducing construction cost.

The abovementioned description of the disclosed embodiments enables those skilled in the art to implement or use the present invention. Multiple modifications to these embodiments are obvious to those skilled in the art, and general principles defined herein can be implemented in other embodiments without departing from the spirit or scope of the present invention. Therefore, the present invention will not be limited to theses embodiments illustrated herein, but needs to be in line with the widest scope consistent with the principles and novel features disclosed herein.

What is claimed is:

1. An indoor accompanying photoelectric composite cable, comprising:
    power transmission components,
    optical fiber transmission components; and
    structural strengthening components,
    wherein the power transmission components include a cable core and an insulating material wrapped around the cable core, the cable core being a non-flammable flame-retardant material,
    wherein the power transmission components, optical fiber transmission components; and structural strengthening components are covered by a flame-retardant outer protective layer,
    wherein the power transmission components comprise a cable core which is a soft conductor and an insulating material layer wrapped around the cable core, the optical fiber transmission components comprise a tight tube optical fiber, and the power transmission components and the optical fiber transmission components are arranged in parallel inside the flame-retardant outer protective layer,
    wherein the structural strengthening components comprise multiple strands of high elastic tensile steel wires,
    wherein the power transmission components and the structural strengthening components are two different components separated by the flame-retardant outer protective layer and the power transmission components are disposed at an inside of the structural strengthening components,
    wherein a plurality of stress grooves are formed between the power transmission components and the optical fiber transmission components, and between the optical fiber transmission components, and
    wherein the tight tube optical fiber consists of, in sequence from inside to outside: a fiber core, a high-strength aramid fiber layer for improving flexibility of the photoelectric composite cable, and a tight-buffered coating layer, the high-strength aramid fiber layer being wrapped around the fiber core, and the tight-buffered coating layer being wrapped outside the high-strength aramid fiber layer.

2. The indoor accompanying photoelectric composite cable as claimed in claim 1 wherein the insulating material is polyvinyl chloride or polyolefin, and the soft conductor is a multi-core stranded copper conductor.

3. The indoor accompanying photoelectric composite cable as claimed in claim 1, wherein the flame-retardant outer protective layer is a flame-retardant polyolefin outer protective layer.

4. The indoor accompanying photoelectric composite cable as claimed in claim 1, wherein the photoelectric composite cable is in a rectangular shape.

5. The indoor accompanying photoelectric composite cable as claimed in claim 1, wherein the photoelectric composite cable comprises two power transmission components, four optical fiber transmission components and two structural strengthening components.

6. The indoor accompanying photoelectric composite cable as claimed in claim 5, wherein the internal components of the photoelectric composite cable are arranged in such a way that the power transmission components, the optical fiber transmission components, and the structural strengthening components are all arranged in parallel, the structural strengthening components are provided on two sides of the photoelectric composite cable, the power transmission components are respectively disposed at the inner side of the structural strengthening components, and the optical fiber transmission components are disposed between the two power transmission components.

* * * * *